(12) United States Patent
Uhlig et al.

(10) Patent No.: US 11,934,574 B2
(45) Date of Patent: Mar. 19, 2024

(54) MODIFYING VEHICLE DISPLAY PARAMETERS USING OPERATOR GAZE

(71) Applicant: GHOST AUTONOMY INC., Mountain View, CA (US)

(72) Inventors: Volkmar Uhlig, Cupertino, CA (US); Mario Delgado, San Francisco, CA (US)

(73) Assignee: GHOST AUTONOMY INC., Mountain View, CA (US)

( * ) Notice: Subject to any disclaimer, the term of this patent is extended or adjusted under 35 U.S.C. 154(b) by 0 days.

(21) Appl. No.: 17/866,061

(22) Filed: Jul. 15, 2022

(65) Prior Publication Data

US 2024/0019929 A1    Jan. 18, 2024

(51) Int. Cl.
| | | |
|---|---|---|
| *G06F 3/01* | (2006.01) | |
| *B60H 1/00* | (2006.01) | |
| *B60K 35/00* | (2006.01) | |
| *G06F 3/14* | (2006.01) | |

(52) U.S. Cl.
CPC ......... *G06F 3/013* (2013.01); *B60H 1/00985* (2013.01); *B60K 35/00* (2013.01); *G06F 3/017* (2013.01); *G06F 3/14* (2013.01); *B60K 2370/146* (2019.05); *B60K 2370/149* (2019.05); *B60K 2370/349* (2019.05)

(58) Field of Classification Search
CPC .... G06F 3/013; B60K 35/00; B60K 2370/149
See application file for complete search history.

(56) References Cited

U.S. PATENT DOCUMENTS

| | | | | |
|---|---|---|---|---|
| 2012/0271484 A1* | 10/2012 | Feit | ...................... | B60W 40/04 701/1 |
| 2012/0300061 A1* | 11/2012 | Osman | .................... | G06F 1/325 340/436 |
| 2014/0292665 A1* | 10/2014 | Lathrop | ................ | G06F 3/0416 345/173 |
| 2016/0196098 A1* | 7/2016 | Roth | ....................... | G09G 5/00 715/761 |
| 2017/0364148 A1* | 12/2017 | Kim | ...................... | G06F 3/1454 |
| 2020/0012342 A1* | 1/2020 | Hassani | ................ | G02B 27/28 |
| 2021/0232278 A1* | 7/2021 | Heber | .................... | B60K 35/00 |

* cited by examiner

*Primary Examiner* — Matthew A Eason
*Assistant Examiner* — Chayce R Bibbee

(57) ABSTRACT

Modifying vehicle display parameters using operator gaze, including: detecting a gaze of an operator of a vehicle; and modifying one or more parameters of a display based on the gaze of the operator.

17 Claims, 10 Drawing Sheets

MODIFYING VEHICLE DISPLAY PARAMETERS USING OPERATOR GAZE

BACKGROUND

Field of the Invention

The field of the invention is vehicle systems, or, more specifically, methods, apparatus, autonomous vehicles, and products for modifying vehicle parameters using operator gaze.

Description of Related Art

Vehicle systems may present content to an operator or other occupants via a display. The parameters of the display may remain fixed during driving, failing to cater to the particular needs of the occupants.

SUMMARY

Modifying vehicle parameters using operator gaze may include detecting a gaze of an operator of a vehicle; and modifying one or more parameters of a display based on the gaze of the operator.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

The terminology used herein for the purpose of describing particular examples is not intended to be limiting for further examples. Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements, and/or components, but do not preclude the presence or addition of one or more other features, integers, steps, operations, processes, acts, elements, components, and/or any group thereof. Additionally, when an element is described as "plurality," it is understood to mean two or more of such an element. However, as set forth above, further examples may implement the same functionality using a single element.

It will be understood that when an element is referred to as being "connected" or "coupled" to another element, the elements may be directly connected or coupled or via one or more intervening elements. If two elements A and B are combined using an "or," this is to be understood to disclose all possible combinations, i.e. only A, only B, as well as A and B. An alternative wording for the same combinations is "at least one of A and B." The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
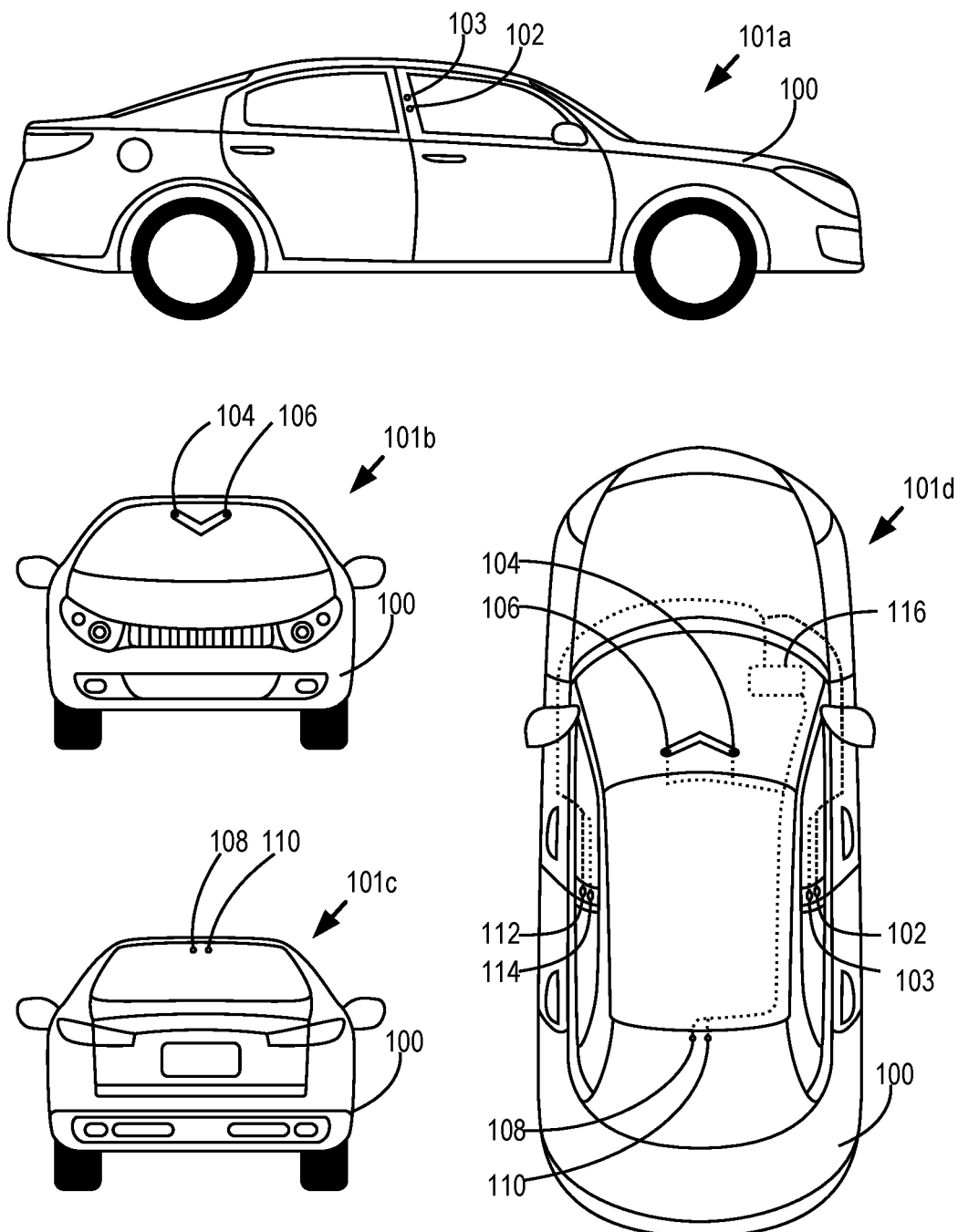
FIG. 1 shows example views of an autonomous vehicle for modifying vehicle parameters using operator gaze according to some embodiments of the present disclosure according to some embodiments of the present disclosure.

Modifying vehicle display parameters using operator gaze may be implemented in an autonomous vehicle. Accordingly, FIG. 1 shows multiple views of an autonomous vehicle 100 configured for modifying vehicle display parameters using operator gaze according to embodiments of the present disclosure. Right side view 101a shows a right side of the autonomous vehicle 100. Shown in the right-side view 101a are cameras 102 and 103, configured to capture image data, video data, and/or audio data of the environmental state of the autonomous vehicle 100 from the perspective of the right side of the car. Front view 101b shows a front side of the autonomous vehicle 100. Shown in the front view 101b are cameras 104 and 106, configured to capture image data, video data, and/or audio data of the environmental state of the autonomous vehicle 100 from the perspective of the front of the car. Rear view 101c shows a rear side of the autonomous vehicle 100. Shown in the rear view 101c are cameras 108 and 110, configured to capture image data, video data, and/or audio data of the environmental state of the autonomous vehicle 100 from the perspective of the rear of the car. Top view 101d shows a rear side of the autonomous vehicle 100. Shown in the top view 101d are cameras 102-110. Also shown are cameras 112 and 114, configured to capture image data, video data, and/or audio data of the environmental state of the autonomous vehicle 100 from the perspective of the left side of the car.

Further shown in the top view 101d is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine an operational state and/or operational history of the autonomous vehicle. The automation computing system 116 may then determine one or more operational commands for the autonomous vehicle (e.g., a change in speed or acceleration, a change in brake application, a change in gear, a change in turning or orientation). The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 if FIG. 1 is shown as car, it is understood that autonomous vehicles 100 configured for modifying vehicle display parameters using operator gaze may also include other vehicles, including motorcycles, planes, helicopters, unmanned aerial vehicles (UAVs, e.g., drones), or other vehicles. Moreover, it is understood that additional cameras or other external sensors may also be included in the autonomous vehicle 100.

Modifying vehicle display parameters using operator gaze in accordance with the present disclosure is generally implemented with computers, that is, with automated computing machinery. For further explanation, therefore, FIG. 2 sets forth a block diagram of automated computing machinery comprising an exemplary automation computing system 116 configured for modifying vehicle display parameters using operator gaze according to specific embodiments. The automation computing system 116 of FIG. 2 includes at least one computer Central Processing Unit (CPU) package 204 as well as random access memory 206 (RAM') which is connected through a high-speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, Lidar sensors, or other sensors. As described herein, cameras may include a solid state sensor 212 with a solid-state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 116 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs)). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery, a capacitor). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 212.

Stored in RAM 206 is an automation module 220. The automation module 220 may be configured to process sensor data from the sensors 212 to determine a driving decision for the autonomous vehicle. The driving decision comprises one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other commands. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222.

In some embodiments, the automation module 220 may be configured to determine an exit path for an autonomous vehicle 100 in motion. The exit path includes one or more operational commands that, if executed, are determined and/or predicted to bring the autonomous vehicle 100 safely to a stop (e.g., without collision with an object, without violating one or more safety rules). The automation module 220 may determine both a driving decision and an exit path at a predefined interval. The automation module 220 may then send the driving decision and the exit path to the autonomous vehicle control systems 223. The autonomous vehicle control systems 223 may be configured to execute the driving decision unless an error state has been reached. If an error decision has been reached, therefore indicating a possible error in functionality of the automation computing system 116, the autonomous vehicle control systems 223 may then execute a last received exit path in order to bring the autonomous vehicle 100 safely to a stop. Thus, the autonomous vehicle control systems 223 are configured to receive both a driving decision and exit path at predefined intervals, and execute the exit path in response to an error.

The autonomous vehicle control systems 223 are configured to affect the movement and operation of the autonomous vehicle 100. For example, the autonomous vehicle control systems 223 may activate (e.g., apply one or more control signals) to actuators or other components to turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor 212 data (e.g., sensor 212 data having object recognition, compression, depth filtering, or any combination of these). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 218) prior to upload to an execution environment 227. Such operations can include filtering, compression, encoding, decoding, or other operations. The data processing module 226 may then communicate the processed and stored sensor data to the execution environment 227.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. Each instance of virtual machine 229 may host the same operating system or one or more different operating systems. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation modules 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows, AIX™, IBM's i OS™, and others. For example, the autonomous vehicle 100 may be configured to execute a first operating system when the autonomous vehicle is in an autonomous (or partially autonomous) driving mode and the autonomous vehicle 100 may be configured to execute a second operating system when the autonomous vehicle is not in an autonomous (or partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Although the example included in the preceding paragraph relates to an embodiment where the autonomous vehicle 100 may be configured to execute a first operating system when the autonomous vehicle is in an autonomous (or partially autonomous) driving mode and the autonomous vehicle 100 may be configured to execute a second operating system when the autonomous vehicle is not in an autonomous (or partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. The time constraint may not necessarily be in real-time, but instead with the highest or one of the highest priorities so that operations indicated for a real-time modality are executed faster than operations without such a priority. For example, as the automation module 220 must make determinations as to operational commands to facilitate autonomous operation of a vehicle. Accordingly, the automation module 220 must make such determinations within one or more time constraints in order for autonomous operation to be performed in real-time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constraints, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
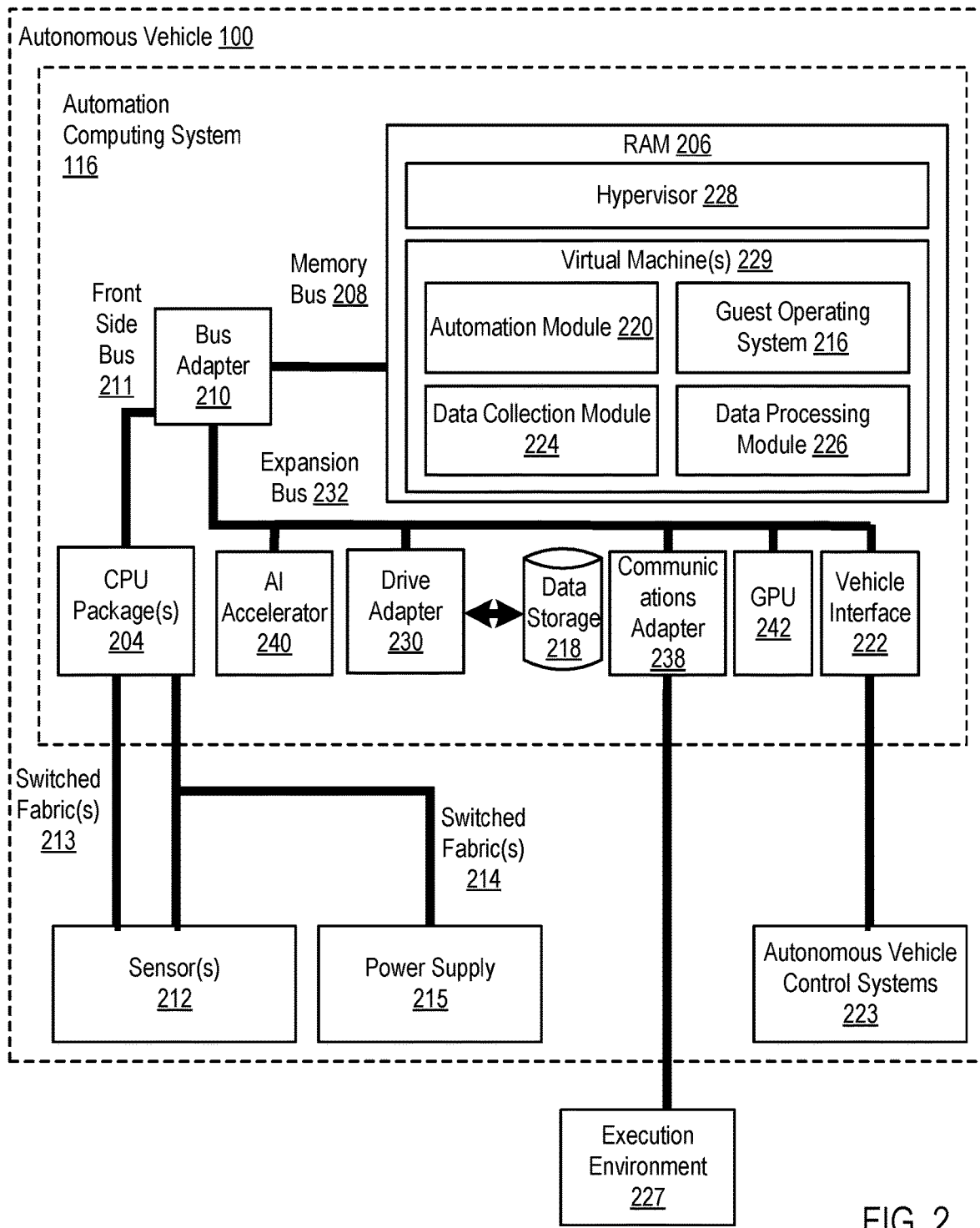
FIG. 2 is a block diagram of an autonomous computing system for modifying vehicle parameters using operator gaze according to some embodiments of the present disclosure.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to CPU package(s) 204 and other components of the automation computing system 116. Disk drive adapter 230 connects non-volatile data storage to the automation computing system 116 in the form of data storage 218. Disk drive adapters 230 useful in computers configured for modifying vehicle display parameters using operator gaze according to various embodiments include Integrated Drive Electronics (IDE') adapters, Small Computer System Interface (SCSI') adapters, and others. Non-volatile computer memory also may be implemented for as an optical disk drive, electrically erasable programmable read-only memory (so-called 'EEPROM' or 'Flash' memory), RAM drives, and so on.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways. Communications adapters implement the hardware level of data communications through which one computer sends data communications to another computer, directly or through a data communications network. Examples of communications adapters useful in computers configured for modifying vehicle display parameters using operator gaze according to specific embodiments include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
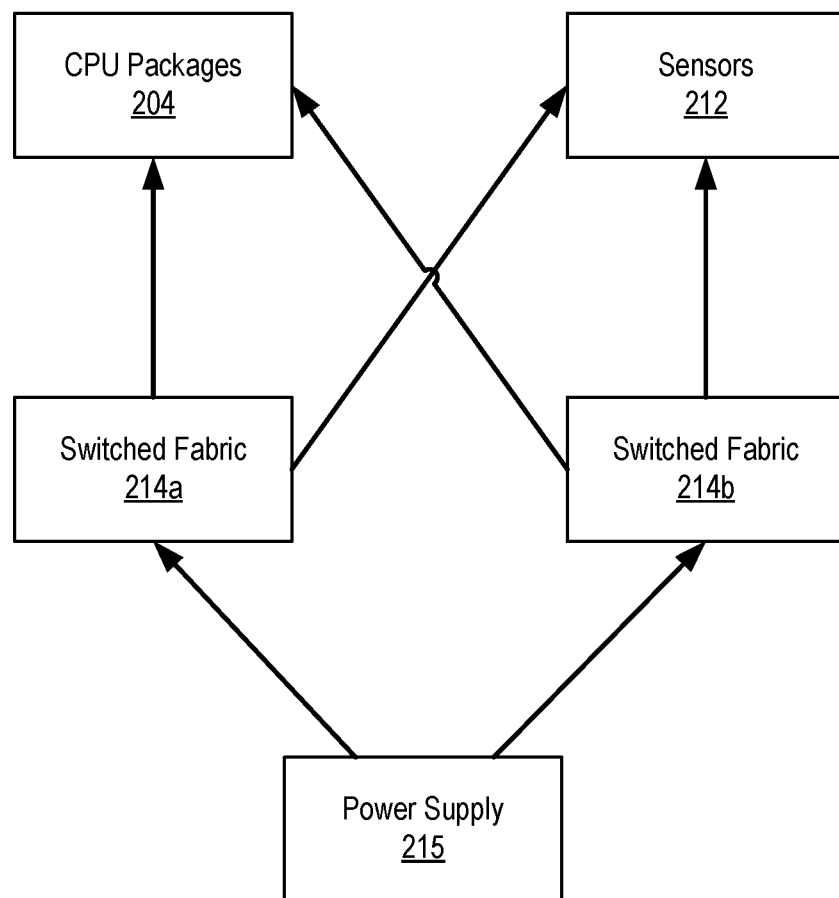
FIG. 3 is a block diagram of a redundant power fabric for modifying vehicle parameters using operator gaze according to some embodiments of the present disclosure.

FIG. 3 shows an example redundant power fabric for modifying vehicle display parameters using operator gaze. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, the approach shown by FIG. 3 can be modified to include three, four, five, or more switched fabrics 214.

Figure 4:
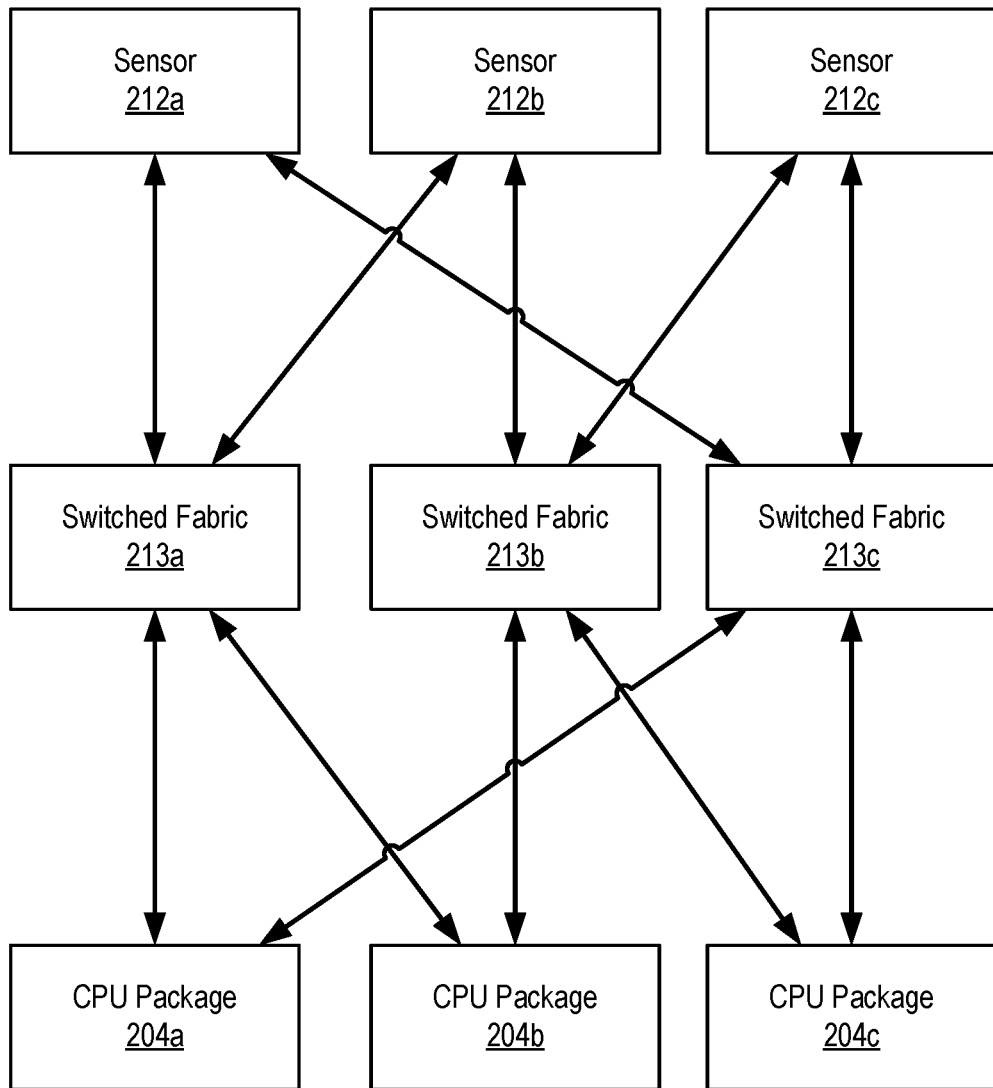
FIG. 4 is a block diagram of a redundant data fabric for modifying vehicle parameters using operator gaze according to some embodiments of the present disclosure.

FIG. 4 is an example redundant data fabric for modifying vehicle display parameters using operator gaze. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy.

Figure 5:
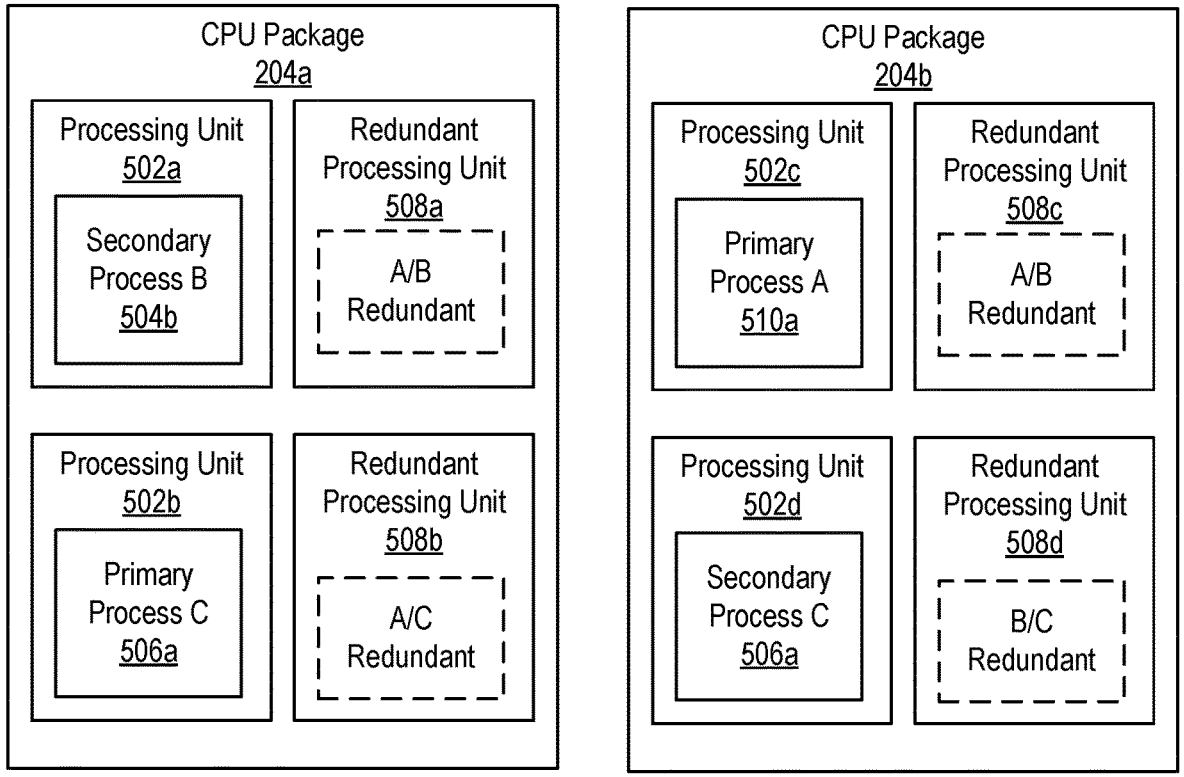
FIG. 5 is an example view of process allocation across CPU packages for modifying vehicle parameters using operator gaze according to some embodiments of the present disclosure.
Figure 5:
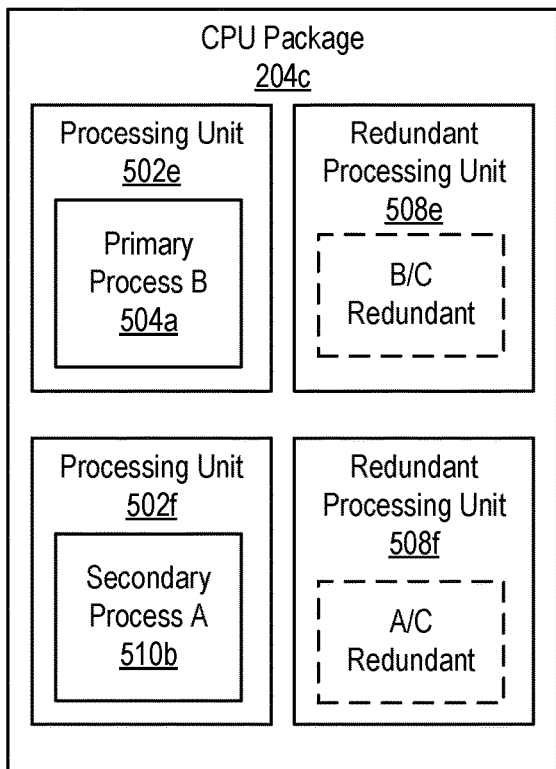

FIG. 5 is an example view of process allocation across CPU packages for modifying vehicle display parameters using operator gaze. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504b, while processing unit 502b has been allocated primary execution of "process C," denoted as primary process C 506a.

CPU package 204a also comprises two redundant processing units that are not actively executing a process A, B, or C, but are instead reserved in case of failure of an active processing unit. Redundant processing unit 508a has been reserved as "A/B redundant," indicating that reserved processing unit 508a may be allocated primary or secondary execution of processes A or B in the event of a failure of a processing unit allocated the primary or secondary execution of these processes. Redundant processing unit 508b has been reserved as "A/C redundant," indicating that reserved processing unit 508b may be allocated primary or secondary execution of processes A or C in the event of a failure of a processing unit allocated the primary or secondary execution of these processes.

CPU package 204b includes processing unit 502c, which has been allocated primary execution of "process A," denoted as primary process A 510a, and processing unit 502d, which has been allocated secondary execution of "process C," denoted as secondary process C 506a. CPU package 204b also includes redundant processing unit 508c, reserved as "A/B redundant," and redundant processing unit 508d, reserved as "B/C redundant." CPU package 204c includes processing unit 502e, which has been allocated primary execution of "process B," denoted as primary process B 504a, and processing unit 502f, which has been allocated secondary execution of "process A," denoted as secondary process A 510b. CPU package 204c also includes redundant processing unit 508e, reserved as "B/C redundant," and redundant processing unit 508f, reserved as "A/C redundant."

As set forth in the example view of FIG. 5, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508a—f allow for allocation of primary or secondary execution of a process in the event of processing unit failure. This further prevents errors caused by processing unit failure as parallel primary and secondary execution of a process may be restored. The number of CPU packages, processing units, redundant processing units, and processes may be modified according to performance requirements while maintaining redundancy.

Figure 6:
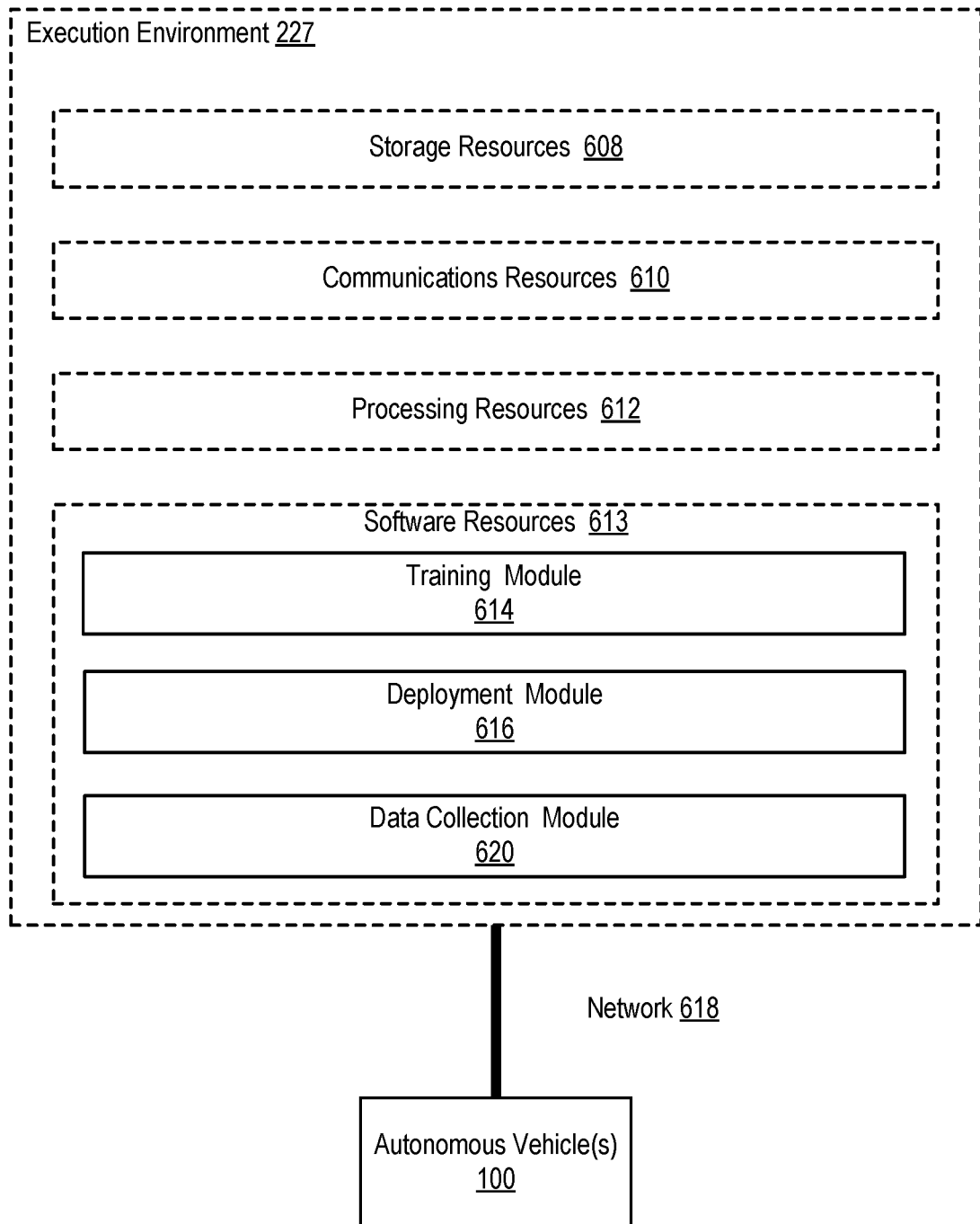
FIG. 6 is an example view of an execution environment for modifying vehicle parameters using operator gaze according to some embodiments of the present disclosure.

For further explanation, FIG. 6 sets forth a diagram of an execution environment 227 in accordance with some embodiments of the present disclosure. The execution environment 227 depicted in FIG. 6 may be embodied in a variety of different ways. The execution environment 227 may be provided, for example, by one or more physical or virtual machine components consisting of bare-metal applications, operating systems such as Android, Linux, Real-time Operating systems (RTOS), Automotive RTOS, such as AutoSAR, and others, including combinations thereof. The execution environment 227 may also be provided by cloud computing providers such as Amazon AWS™, Microsoft Azure™, Google Cloud™, and others, including combinations thereof. Alternatively, the execution environment 227 may be embodied as a collection of devices (e.g., servers, storage devices, networking devices) and software resources that are included in a computer or distributed computer or private data center. The execution environment 227 may be constructed in a variety of other ways and may even include resources within one or more autonomous vehicles or resources that communicate with one or more autonomous vehicles.

The execution environment 227 depicted in FIG. 6 may include storage resources 608, which may be embodied in many forms. For example, the storage resources 608 may include flash memory, hard disk drives, nano-RAM, 3D crosspoint non-volatile memory, MRAM, non-volatile phase-change memory (PCM), storage class memory (SCM), or many others, including combinations of the storage technologies described above. Other forms of computer memories and storage devices may be utilized as part of the execution environment 227, including DRAM, SRAM, EEPROM, universal memory, and many others. The storage resources 608 may also be embodied, in embodiments where the execution environment 227 includes resources offered by a cloud provider, as cloud storage resources such as Amazon Elastic Block Storage (EBS) block storage, Amazon S3 object storage, Amazon Elastic File System (EFS) file storage, Azure Blob Storage, and many others. The example execution environment 227 depicted in FIG. 6 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 227 depicted in FIG. 6 also includes communications resources 610 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 610 may be configured to utilize a variety of different protocols and data communication fabrics to facilitate data communications. For example, the communications resources 610 may utilize Internet Protocol ('IP') based technologies, fibre channel (FC) technologies, FC over ethernet (FCoE) technologies, InfiniBand (TB) technologies, NVM Express (NVMe) technologies and NVMe over fabrics (NVMeoF) technologies, and many others. The communications resources 610 may also be embodied, in embodiments where the execution environment 227 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle).

The execution environment 227 depicted in FIG. 6 also includes processing resources 612 that may be useful in useful in executing computer program instructions and performing other computational tasks within the execution environment 227. The processing resources 612 may include one or more application-specific integrated circuits (ASICs) that are customized for some particular purpose, one or more central processing units (CPUs), one or more digital signal processors (DSPs), one or more field-programmable gate arrays (FPGAs), one or more systems on a chip (SoCs), or other form of processing resources 612. The processing resources 612 may also be embodied, in embodiments where the execution environment 227 includes resources offered by a cloud provider, as cloud computing resources such as one or more Amazon Elastic Compute Cloud (EC2) instances, event-driven compute resources such as AWS Lambdas, Azure Virtual Machines, or many others.

The execution environment 227 depicted in FIG. 6 also includes software resources 613 that, when executed by processing resources 612 within the execution environment 227, may perform various tasks. The software resources 613 may include, for example, one or more modules of computer program instructions that when executed by processing resources 612 within the execution environment 227 are useful in training neural networks configured to determine control autonomous vehicle control operations. For example, a training module 614 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 614 may provide a corpus of training data, or a selected subset of training data, to train the neural network. For example, the training module 614 may select particular subsets of training data associated with particular driving conditions, environment states, etc. to train the neural network.

The software resources 613 may include, for example, one or more modules of computer program instructions that when executed by processing resources 612 within the execution environment 227 are useful in deploying software resources or other data to autonomous vehicles 100 via a network 618. For example, a deployment module 616 may provide software updates, neural network updates, or other data to autonomous vehicles 100 to facilitate autonomous vehicle control operations.

The software resources 613 may include, for example, one or more modules of computer program instructions that when executed by processing resources 612 within the execution environment 227 are useful in collecting data from autonomous vehicles 100 via a network 618. For example, a data collection module 620 may receive, from autonomous vehicles 100, collected sensor 212, associated control operations, software performance logs, or other data. Such data may facilitate training of neural networks via the training module 614 or stored using storage resources 608.

Figure 7:
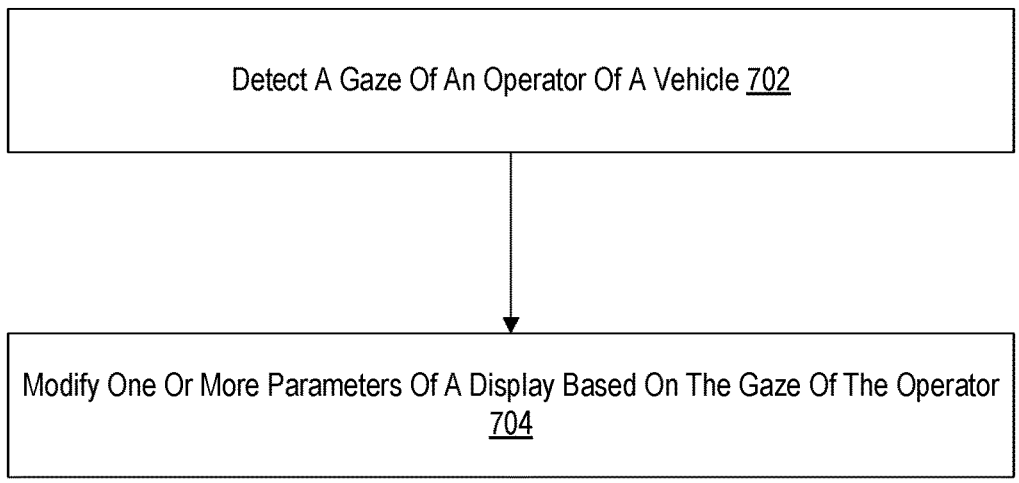
FIG. 7 is a flow chart of an example method for modifying vehicle parameters using operator gaze according to some embodiments of the present disclosure.

For further explanation, FIG. 7 sets forth a flow chart illustrating an exemplary method for modifying vehicle parameters using operator gaze according to some embodiments of the present disclosure. The method of FIG. 7 may be performed, for example, in an autonomous vehicle such as an autonomous vehicle 100. Accordingly, in such embodiments, the method of FIG. 7 may be performed at least in part using an automation computing system 116 or other computing components of the autonomous vehicle 100. In some embodiments, the method of FIG. 7 may be performed in a non-autonomous vehicle (e.g., a vehicle lacking full autonomous driving functionality) having suitable cameras or other sensors facilitating the operations described herein. Accordingly, in such embodiments, the method of FIG. 7 may be performed at least in part using a vehicle control system (VCS), electronic control unit (ECU), or other computing components of a vehicle.

The method of FIG. 7 includes detecting 702 a gaze of an operator of a vehicle. For example, where the vehicle is a non-autonomous vehicle or operating in a non-autonomous driving mode, the operator may include a driver of the vehicle. As another example, the operator may include an occupant of a driver's seat or other designated seat within a cabin or interior of the vehicle.

The gaze of the operator includes an area of interest or view of the operator. Accordingly, detecting 702 the gaze of the operator may include detecting a particular direction or angle of view of the operator, detecting a particular area of interest of the operator (e.g., a particular object or region viewed by the operator), and the like. Detecting 702 the gaze of the operator may be facilitated using one or more camera sensors. Such camera sensors may be housed in the interior of the vehicle or the exterior of the vehicle and are directed or faced to capture video data of the interior of the vehicle. Using the captured video data, eye tracking algorithms may be used to track the area of interest of the operator and therefore detect 702 the gaze of the operator.

In some embodiments, as will be described in further detail below, the operator may be outside of the vehicle. For example, a person designated as the operator of the vehicle or determined to be the operator of the vehicle (e.g., by virtue of being on the driver's side of the vehicle, by possessing a key fob or other device linked to the vehicle) may be outside of the vehicle. Accordingly, the gaze of the operator may be determined using video data captured by cameras facing an exterior of the vehicle and capturing individuals outside of the vehicle. The gaze of such an operator may be determined using eye tracking algorithms or using similar approaches as are described above.

The gaze of the operator may be defined relative to a display of a vehicle. The display of the vehicle may include, for example, a human machine interface (HMI) such as a touch screen display, a non-interactive display, and the like. The display may be mounted on or in a dashboard of the vehicle or otherwise positioned so as to be viewable by the operator and potentially other occupants of the vehicle. Accordingly, in some embodiments, the gaze of the operator may be defined as whether or not the operator is viewing or gazing the display. In some embodiments, the gaze of the operator may be defined as an angle of the gaze of the operator relative to the display. For example, in some embodiments, detecting 702 the gaze of the operator may include detecting an angle of gaze of the operator relative to some point in the display, such as a center point of the display, a particular user interface element or image on the display, or other points. In an embodiment, the vehicle may include more than one display (e.g., a dash display, a center console display, a side mirror display, a rear mirror display). In some embodiments, the gaze of the operator may be defined as a label or category of the area of interest of the operator, such as the display, the road, a rearview mirror, a side mirror, or other areas.

The method of FIG. 7 also includes modifying 704 one or more parameters of a display based on the gaze of the operator. In some embodiments, the one or more parameters includes one or more settings of the display, such as a display brightness, a display contrast, and the like. For example, where a gaze of the operator is directed to the display (e.g., where it is determined that an area of interest of the operator includes the display, where an angle of the gaze of the operator relative to the display falls below a threshold) the brightness of the display may be increased to increase the viewability of the display. In contrast, where the gaze of the operator is not directed to the display, the brightness of the display may be reduced in order to save power during periods where the display is not actively viewed. In some embodiments, a display may be turned on or off depending on whether the operator is viewing the display.

In some embodiments, modifying 704 the one or more parameters of the display includes modifying how particular content is presented or what content is presented via the display. For example, in some embodiments, the one or more parameters includes a size of content being displayed, such as a text size, image size, window size, and the like. Continuing with this example, the size of content being displayed may be increased when the operator is viewing the display and decreased when the operator is not viewing the display.

In some embodiments, the one or more parameters of the display includes a type of content being displayed. For example, particular portions of text, particular images, particular metrics, user interface elements, applications, and the like may be presented on the display depending on whether or not the operator is viewing the display. Continuing with this example, assume that a navigation system is activated in order to determine driving directions to a particular location. Where the operator is viewing the display, a map or other location information may be displayed. Where the operator is not viewing the display, other content (e.g., currently playing media information and the like) may instead be displayed. For example, more static content such as text may be displayed when the operator is not viewing the display so as to not distract or attract the gaze of the operator. When the operator is viewing the display, more animated or active content such as maps or dynamically updating content may instead be displayed. As a further example, where an operator is not viewing the display, a map for active driving directions may be displayed. Where the operator is viewing the display, other information such as information describing a next turn in a route may instead be displayed to the operator. In other words, where an operator is not viewing the display, a summarized or less detailed set of information may be presented, whereas a more detailed set of information may be presented where the operator is viewing the display. In some embodiments, an information density (e.g., an amount of information or a level of detail of information presented) may be modified based on a duration of an operator gaze towards a display. For example, as an operator views a display over time, more detailed or higher fidelity maps may be shown.

In some embodiments, the one or more parameters of the display may be modified 704 based on a distance of the operator to the display. The distance of the operator to the display may be determined based on various camera sensors (e.g., interior camera sensors, exterior camera sensors, and the like). For example, where an operator inside the vehicle is positioned further from the display by virtue of their posture or seat position, the brightness, content size, and the like may be increased relative to the distance of the operator from the display. As another example, where the operator is outside the vehicle but looking into the interior of the vehicle at the display, the brightness, content size, content, and the like may be adjusted based on the distance of the operator to the display.

Figure 8:
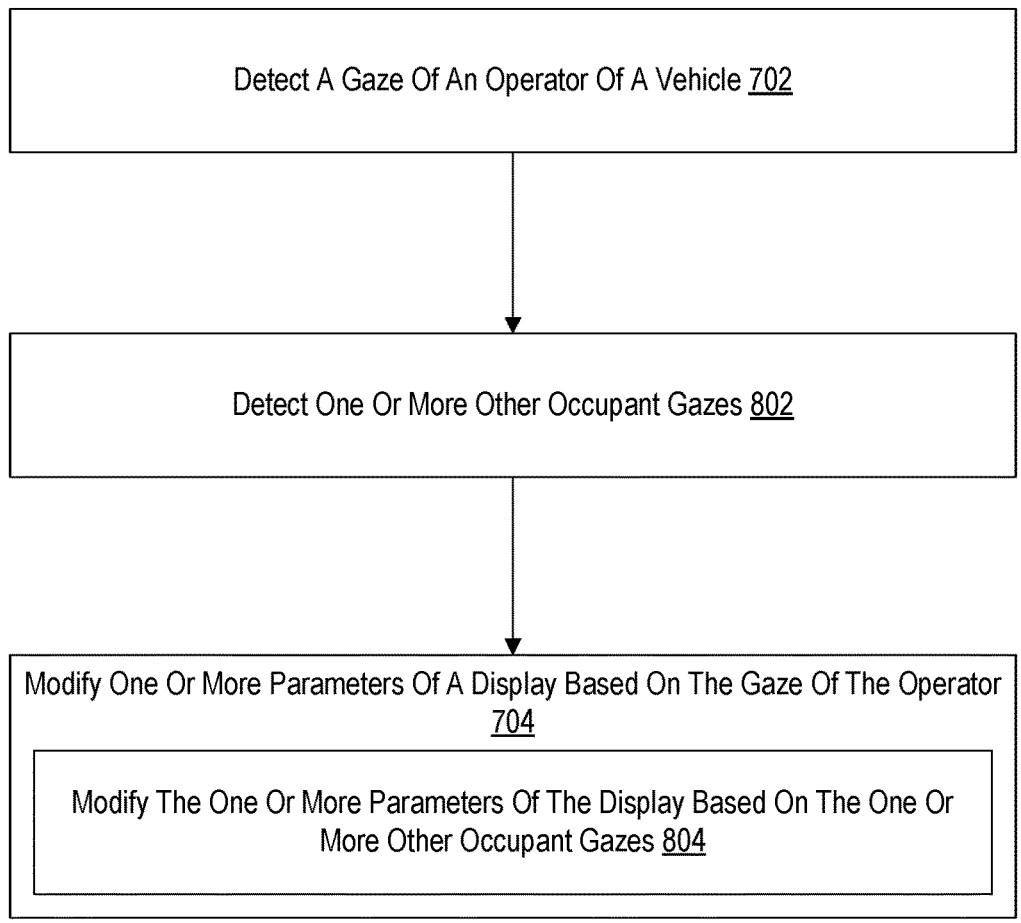
FIG. 8 is a flow chart of another example method for modifying vehicle parameters using operator gaze according to some embodiments of the present disclosure.

For further explanation, FIG. 8 sets forth a flowchart of another example method for modifying vehicle parameters using operator gaze according to some embodiments of the present disclosure. The method of FIG. 8 is similar to FIG. 7 in that the method of FIG. 8 includes detecting 704 a gaze of an operator of a vehicle; and modifying 704 one or more parameters of a display based on the gaze of the operator.

The method of FIG. 8 differs from FIG. 7 in that the method of FIG. 8 also includes detecting 802 one or more other occupant gazes. The other occupants may include other occupants of the vehicle (e.g., located within the interior of the vehicle). Such occupants may be seated or located, for example, in a passenger seat, in a back seat, or in other seats of the vehicle other than a driver's seat.

In some embodiments, detecting 802 the one or more other occupant gazes may be performed using similar approaches as are set forth above with respect to detecting 702 a gaze of an operator of a vehicle. For example, camera sensors (e.g., interior camera sensors) may be used to capture video data of the interior or cabin of the vehicle. Eye tracking or other algorithms may be used to detect the gaze of the other occupants of the vehicle. The gazes of the other occupants of the vehicle may be defined using similar approaches as the gaze of the operator. For example, the gaze of another occupant may be defined as whether or not the occupant is viewing the display, as an angle of view relative to the display, as a category or label of an object viewed by the occupant, and the like.

The method of FIG. 8 further differs from FIG. 7 in that modifying 704 one or more parameters of a display based on the gaze of the operator includes modifying 804 the one or more parameters of the display based on the one or more other occupant gazes. The parameters modified may include similar parameters as are modified based on the gaze of the operator, such as a display setting, a type of content, a size of content, and the like.

In some embodiments, the parameters modified based on the gaze of other occupants are the same as the parameters modified based on the gaze of the operator. That is, each parameter that may be modified can be modified using the gaze of the operator and the gaze of the other occupants. In other embodiments, different subsets of the parameters may be modified based on the gaze of the operator or the gaze of the other occupants. For example, display settings, content size, and content type may be modified based on the gaze of the operator, while only display settings may be modified based on the gaze of other operators. This combination of parameters is merely exemplary and that other combinations of parameters may also be modified based on the gaze of the operator and the gaze other occupants.

In some embodiments, the one or more parameters may be modified 804 based on the one or more other occupant gazes using similar approaches as are set forth above with respect to the operator gaze. For example, a brightness of the display may be increased in response to being viewed by another occupant. As another example, a size of content (e.g., text size, image size, and the like) may be increased in response to being viewed by another occupant.

In some embodiments, the one or more parameters of the display may be modified such that a viewing of the display by the operator overrides one or more parameter modifications performed in response to the display being viewed by the other occupants. For example, assume that first content is presented via the display in response to no occupant or operator viewing the display. In response to another occupant viewing the display, second content may be presented via the display. In response to the occupant viewing the display, content other than the second content (e.g., the first content or different third content) may be presented via the display independent of whether or not another occupant is also viewing the display. In other words, modifications to the one or more parameters performed in response to an operator viewing the display may take priority or override modifications to the one or more parameters performed in response to other occupants viewing the display.

In some embodiments, one or more parameters of other displays may also be modified using the gaze of the one or more other occupants. For example, displays visible to other occupants but not to the operator, such as displays mounted in the back of a headrest or in an occupant-accessible console, may be modified according to similar approaches as are set forth above. Accordingly, the parameters of the other displays may be modified independent of the parameters of the display as described above.

Figure 9:
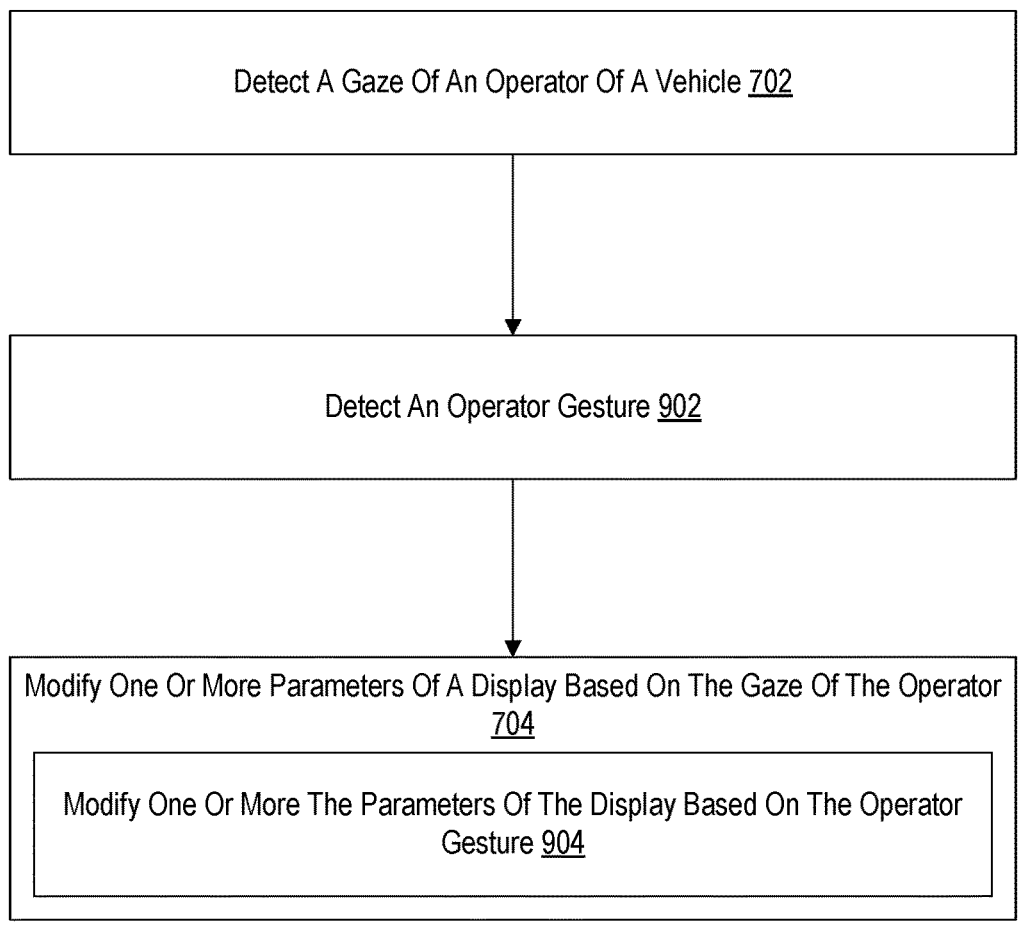
FIG. 9 is a flow chart of another example method for modifying vehicle parameters using operator gaze according to some embodiments of the present disclosure.

For further explanation, FIG. 9 sets forth a flowchart of another example method for modifying vehicle parameters using operator gaze according to some embodiments of the present disclosure. The method of FIG. 9 is similar to FIG. 7 in that the method of FIG. 9 includes detecting 704 a gaze of an operator of a vehicle; and modifying 704 one or more parameters of a display based on the gaze of the operator.

The method of FIG. 9 differs from FIG. 7 in that the method of FIG. 9 also includes detecting 902 an operator gesture. In some embodiments, a gesture of an operator includes a movement of a hand, arm, or other part of the operator. In some embodiments, a gesture of an operator may also include a change in position, posture, or other physical positioning of the operator. For example, the gestures may include waving, swiping, and the like. Detecting 902 an operator gesture may be performed based on video data captured by one or more interior camera sensors of the vehicle. Accordingly, in some embodiments, detecting 902 an operator gesture may include providing the video data to one or more models configured to identify, from the video data, particular gestures in the video data. In some embodiments, the one or more operator gestures may be detected 902 based on motion sensors or other sensors configured to sense the interior of the vehicle. Particularly, in some embodiments, the gesture 902 is detected independent of any contact with a touch screen or other input device requiring physical contact by an operator.

The method of FIG. 9 further differs from FIG. 7 in that modifying 704 one or more parameters of a display based on the gaze of the operator includes modifying 904 the one or more parameters of the display based on the operator gesture. For example, in some embodiments, a brightness, content size, particular content, and the like may be modified in response to detecting 902 the operator gesture.

In some embodiments, particular modifications to the one or more parameters may correspond to particular gestures. Accordingly, in some embodiments, the one or more parameters of the display may be modified based on a particular detected gesture. For example, in some embodiments, particular gestures may increase or decrease display brightness, while other gestures may increase or decrease text size. These combinations of gestures and parameter modifications are merely exemplary, and that other combinations of gestures and parameter modifications are also contemplated within the scope of the present disclosure.

In some embodiments, gestures of other occupants may also be detected according to similar approaches as are set forth above with respect to detecting the operator gesture. In such embodiments, the parameters of the display or other displays (e.g., displays visible to the other occupants and not the operator) may also be modified according to detected occupant gestures according to similar approaches.

Figure 10:
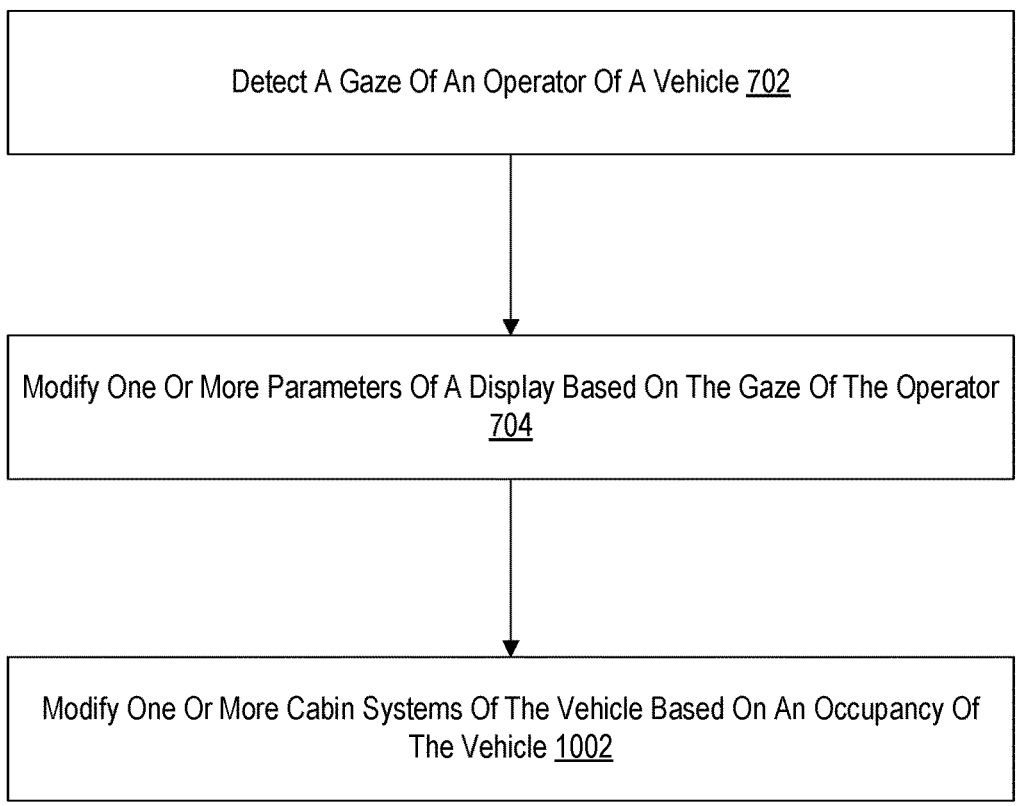
FIG. 10 is a flow chart of another example method for modifying vehicle parameters using operator gaze according to some embodiments of the present disclosure.

For further explanation, FIG. 10 sets forth a flowchart of another example method for modifying vehicle parameters using operator gaze according to some embodiments of the present disclosure. The method of FIG. 10 is similar to FIG. 7 in that the method of FIG. 10 includes detecting 704 a gaze of an operator of a vehicle; and modifying 704 one or more parameters of a display based on the gaze of the operator.

The method of FIG. 10 differs from FIG. 7 in that the method of FIG. 10 also includes modifying 1002 one or more cabin systems of the vehicle based on an occupancy of the vehicle. An occupancy of the vehicle may be defined as a number of occupants of the vehicle (e.g., including the operator and any other occupants in the vehicle), a configuration of occupants of the vehicle (e.g., which seats are occupied by occupants), whether or not occupants other than the operator are in the vehicle and the like.

In some embodiments, the occupancy of the vehicle may be determined based on video data from camera sensors of the vehicle. For example, interior-facing camera sensors may capture video data of the interior of the vehicle. The video data may then be analyzed to identify a number of occupants, a configuration of occupants, and the like. As another example, exterior-facing camera sensors may be used to capture video data of occupants entering the vehicle.

This video data may be similarly analyzed in order to determine a number of occupants entering the vehicle. In some embodiments, the occupancy of the vehicle may be determined based on one or more weight or pressure sensors of the vehicle. For example, weight or pressure sensors in particular seats of the vehicle may be used to determine which seats of the vehicle are occupied, and thereby determine a number of occupants of the vehicle or a configuration of the occupants of the vehicle.

The one or more cabin systems include one or more systems of the vehicle that affect environmental conditions within the cabin of the vehicle from the perspective of the occupants of the vehicle. Such cabin systems may include, for example, air conditioning systems, audio systems, video systems, active power outlets, active input or output ports, and the like. Accordingly, modifying the one or more cabin systems of the vehicle may include activating or deactivating particular cabin systems based on the occupancy of the vehicle.

For example, in some embodiments, modifying 1002 the one or more cabin systems of the vehicle may include activating particular displays of the vehicle based on the occupancy of the vehicle. Continuing with this example, displays facing occupants of the vehicle other than the operator, such as displays housed in drivers or front passenger seats intended for viewing by occupants in a back seat, may be deactivated in response to no occupants in the back seat being detected. Similarly, such displays may be activated in response to occupants in the back seat being detected.

As another example, modifying 1002 the one or more cabin systems of the vehicle may include activating or deactivating a rear air conditioning system, or opening or closing rear air conditioning vents, depending on whether or not occupants are detected in the rear of the vehicle. As a further example, modifying 1002 the one or more cabin systems of the vehicle may include providing or cutting power to power outlets, device ports (e.g., Universal Serial Bus (USB) ports), and the like based on whether an occupant is detected in a corresponding seat of the vehicle. Thus, power is saved by deactivating systems that will not be used by virtue of no occupant being in a particular seat of the vehicle.

In view of the explanations set forth above, the benefits of modifying vehicle parameters using operator gaze according to embodiments of the present disclosure include:

Improved performance of a vehicle system by customizing display presentation based on occupant viewing.

Improved performance of a vehicle system by saving power on display or other cabin systems based on vehicle occupancy.

Exemplary embodiments of the present disclosure are described largely in the context of a fully functional computer system for modifying vehicle parameters using operator gaze. The present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others. Any computer system having suitable programming means will be capable of executing the steps of the method of the disclosure as embodied in a computer program product. Although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for modifying vehicle display parameters using operator gaze, the method comprising:
    presenting content via a display of a vehicle;
    detecting a gaze of an operator of the vehicle; and
    modifying, in response to a change in the gaze of the operator between being directed to the display or away from the display, a presentation of the content by modifying one or more parameters of a display based on the gaze of the operator, wherein the one or more parameters comprise a type of content presented via the display, wherein modifying the presentation of the content comprises changing between presentation of first content on the display in response to the gaze of the operator being directed away from the display or second content on the display in response to the gaze of the operator being directed toward the display, wherein the first content comprises static content and the second content comprises animated content and wherein the display is active during presentation of the first content and during presentation of the second content.

2. The method of claim 1, wherein the one or more parameters comprise a display brightness.

3. The method of claim 1, wherein the one or more parameters comprise a text size.

4. The method of claim 1, wherein the one or more parameters of the display are further based on a distance of the operator to the vehicle.

5. The method of claim 1, further comprising:
    detecting one or more other occupant gazes; and
    wherein modifying the one or more parameters of the display comprises modifying the one or more parameters of the display based on the one or more other occupant gazes.

6. The method of claim 1, further comprising:
    detecting an operator gesture; and
    wherein modifying the one or more parameters of the display comprises modifying the one or more parameters of the display based on the operator gesture.

7. The method of claim 1, further comprising modifying one or more cabin systems of the vehicle based on an occupancy of the vehicle.

8. An apparatus for modifying vehicle display parameters using operator gaze, the apparatus configured to perform steps comprising:
    presenting content via a display of a vehicle;
    detecting a gaze of an operator of the vehicle; and
    modifying, in response to a change in the gaze of the operator between being directed to the display or away from the display, a presentation of the content by modifying one or more parameters of a display based on the gaze of the operator, wherein the one or more parameters comprise a type of content presented via the display, wherein modifying the presentation of the content comprises changing between presentation of first content on the display in response to the gaze of the operator being directed away from the display or second content on the display in response to the gaze of the operator being directed toward the display, wherein the second content comprises a map and the steps further comprise adding detail of the map over time based on an increased duration of gaze by the operator toward the display.

9. The apparatus of claim 8, wherein the one or more parameters comprise a display brightness.

10. The apparatus of claim 8, wherein the one or more parameters comprise a text size.

11. The apparatus of claim 8, wherein the one or more parameters of the display are further based on a distance of the operator to the vehicle.

12. The apparatus of claim 8, wherein the steps further comprise:
    detecting one or more other occupant gazes; and
    wherein modifying the one or more parameters of the display comprises modifying the one or more parameters of the display based on the one or more other occupant gazes.

13. The apparatus of claim 8, wherein the steps further comprise:
    detecting an operator gesture; and
    wherein modifying the one or more parameters of the display comprises modifying the one or more parameters of the display based on the operator gesture.

14. The apparatus of claim 8, wherein the steps further comprise modifying one or more cabin systems of the vehicle based on an occupancy of the vehicle.

15. A computer program product disposed upon a non-transitory computer readable medium, the computer program product comprising computer program instructions for modifying vehicle display parameters using operator gaze that, when executed, cause a computer system to perform steps comprising:
    presenting content via a display of a vehicle;
    detecting a gaze of an operator of the vehicle; and
    modifying, in response to a change in the gaze of the operator between being directed to the display or away from the display, a presentation of the content by modifying one or more parameters of a display based on the gaze of the operator, wherein the one or more parameters comprise a type of content presented via the display, wherein modifying the presentation of the content comprises changing between presentation of first content on the display in response to the gaze of the operator being directed away from the display or second content on the display in response to the gaze of the operator being directed toward the display, wherein the second content comprises a map and the steps further comprise adding detail of the map over time based on an increased duration of gaze by the operator toward the display.

16. The computer program product of claim 15, wherein the one or more parameters comprise a display brightness.

17. The computer program product of claim 15, wherein the one or more parameters comprise a text size.

* * * * *